United States Patent
Delzenne

(10) Patent No.: US 6,236,013 B1
(45) Date of Patent: May 22, 2001

(54) COMBINED PROCESS AND AUTOMATIC INSTALLATION FOR PLASMA-JET MARKING AND CUTTING OR WELDING, IN PARTICULAR OF METALS

(75) Inventor: Michel Delzenne, Franconville (FR)

(73) Assignee: La Soudure Autogene Francaise, Paris Cedex (FR)

( * ) Notice: Subject to any disclaimer, the term of this patent is extended or adjusted under 35 U.S.C. 154(b) by 0 days.

(21) Appl. No.: 09/425,061

(22) Filed: Oct. 22, 1999

(30) Foreign Application Priority Data

Oct. 22, 1998 (EP) .................................................. 98402628

(51) Int. Cl.[7] .................................................. B23K 10/00
(52) U.S. Cl. ................................ 219/121.54; 219/121.39; 219/121.58; 219/121.48; 219/121.37; 266/67
(58) Field of Search .......................... 219/121.39, 121.44, 219/121.48, 121.45, 121.46, 121.64, 121.72, 121.67, 121.58, 121.37, 121.54; 266/67–72

(56) References Cited

U.S. PATENT DOCUMENTS

| | | |
|---|---|---|
| 3,866,892 * | 2/1975 | Hooper ............................... 268/23 K |
| 5,560,843 * | 10/1996 | Koike et al. ...................... 219/121.48 |
| 5,635,086 * | 6/1997 | Warren, Jr. et al. ............. 219/121.39 |
| 5,760,363 | 6/1998 | Hackett et al. . |
| 5,773,788 | 6/1998 | Lu et al. . |
| 6,054,669 * | 4/2000 | Warren, Jr. ....................... 219/121.39 |

FOREIGN PATENT DOCUMENTS

| | | |
|---|---|---|
| 0 040 925 | 12/1981 | (EP) . |
| 0 599 709 | 6/1994 | (EP) . |
| 0 865 857 | 9/1998 | (EP) . |
| 62-238020 | 10/1987 | (JP) . |
| 2-108464 | 4/1990 | (JP) . |

* cited by examiner

Primary Examiner—Mark Paschall
(74) Attorney, Agent, or Firm—Young & Thompson

(57) ABSTRACT

A process and an automatic installation for plasma-jet marking and for cutting or welding various materials. A carrying structure carries both a plasma-marking torch and at least one torch for plasma or laser cutting, oxycutting or plasma or laser welding. A drive system make it possible to move the torches in one or more directions of motion, and control means make it possible to control the movement of the torches relative to the workpieces to be marked. The torches are supplied with coolant, such as demineralized water, with a plasma gas or gas mixture, and with electric current. The plasma-marking installation according to the invention can be used for marking metals, metal alloys or plastics.

16 Claims, 4 Drawing Sheets

COMBINED PROCESS AND AUTOMATIC INSTALLATION FOR PLASMA-JET MARKING AND CUTTING OR WELDING, IN PARTICULAR OF METALS

BACKGROUND OF THE INVENTION

The invention relates to the field of installations and automatic processes for plasma-jet marking and for cutting or welding workpieces, in particular made of metals or plastics, such as plates or sheets of steel.

Automatic machines or installations For plasma-jet cutting have been used for many years to plasma-jet trim or cut geometrical or other shapes in metal workpieces, such as plates or sheets, in particular made of ferrous and non-ferrous materials.

Plasma cutting is based on the combined thermal and kinetic effects of a plasma jet, that is to say an electric arc created in a strongly constricted ionized-gas medium established between, on the one hand, an emissive element of the plasma torch, forming the cathode, and on the other hand, the sheet or workpiece to be trimmed, forming the anode, these two electrodes, known as the cathode and the anode, being respectively connected to the negative and positive terminals of a DC electricity source, such as a current generator.

Processes and installations for plasma cutting are described, for example, in documents EP-A-0040925, JP-A-02108464, U.S. Pat. No. 5,760,363 and EP-A-0599709.

In view of the progress made both as regards the characteristics of the plasma jets employed (composition of the plasma gas, structure of the electrodes of the plasma torch, power and shape of the plasma jet, etc.) and as regards the cutting machines themselves (numerical control, off-line programming centres, shaft actuators, mechanical structure for guiding and driving the shafts, etc.), it is now possible to integrate this type of plasma-cutting installation in an overall manufacturing line or process, with a view to improving productivity and/or production efficiency.

However, the machines or installations for automatic plasma-jet cutting which currently exist are for the most part usable only for trimming materials. In other words, the plasma jet delivered by a plasma torch with which a cutting installation is equipped will produce melting through the full thickness of the metal workpiece to be machined, so as to obtain trimming of this workpiece with a predefined geometry.

In a manufacturing process, however, at least three types of additions to the trimming operation often prove necessary, namely drawing geometrical markers on the workpieces, identifying the cut workpieces using a number or standardized code, and marking with a standardized code to provide traceability or tracking of the manufactured workpieces.

In general, these additional operations follow the operation of plasma cutting the workpiece, but it is not inconceivable that they may be, or may have also to be carried out before the said plasma-cutting operation in certain cases.

More precisely, the operation of drawing geometrical markers on workpieces which have been trimmed or are to be trimmed, may consist in drawing or marking, in particular:

either continuous or discontinuous positioning lines on workpieces or elements which are intended to be welded or assembled later;

or centre points or centre-locating axes to facilitate subsequent operations of mechanically drilling holes of predefined diameter and position on the workpieces;

or lines or markers for the positioning of tools for subsequently shaping the trimmed workpieces, for example tools for folding the said workpieces.

Furthermore, the identification of workpieces which have been cut or are to be cut by a number or standardized code is also used to label various workpieces in order to identify them more easily and avoid any confusion between these various workpieces during subsequent operations. In fact, identification has, in particular, the advantage that it makes it possible to carry out relatively complex automatic programmes for plasma-jet trimming metal workpieces of highly varied geometries within a standard sheet-metal format, by fitting the said workpieces to be cut around one another in order to minimize loss or waste of metal and therefore optimize production costs.

Furthermore, marking workpieces with a standardized code guarantees that these workpieces are traceable, which is almost essential for companies receiving certification, such as a standard, confirming the quality of their manufacturing, who must be able to monitor the manufactured products that need to comply with this certification.

There are currently several marking systems which are or can be used according to their individual characteristics, the nature of the work to be carried out and the nature of the material or of the workpiece to be identified, namely, on the one hand, so-called "cold" markers, such as ink-jet marking, felt-pen labelling or using a pneumatic punch or electric graver, and, on the other hand, so-called "hot" markers, such as flame-heating the workpiece to be marked while spraying a marking powder, for example zinc powder, or marking the workpiece using a laser beam.

However, depending on the case, these various marking processes present drawbacks having relatively negative repercussions in industrial terms.

Thus, marking a workpiece with an ink jet or felt-pen is not ideal because this marking technique cannot be applied to certain materials, in particular to materials on which the ink pigments adhere poorly or not at all.

It has also been found in practice that this type of marking may, in certain cases, rub off fairly rapidly over the course of time, and that the workpieces then no longer have any identification marking, which poses problems of differentiating between these various workpieces in the subsequent steps of the production or machining process.

Similarly, marking using a pneumatic punch or electric graver may cause problems by deforming the workpiece, and these become all the more serious as the workpiece becomes thinner.

Furthermore, the technique of marking by spraying metal powder cannot be applied to all materials, given that, in particular, the problem arises of the marking powder's compatibility with the material of which the workpiece to be marked is made.

In addition, these marking techniques are often limited to a given material or family of materials, for example steels, and cannot in general be applied to workpieces made of very different types of material, for example metal workpieces and workpieces made of polymers or plastics.

On the other hand, document EP-A-865857 describes a process for marking sheet metal coated with paint, in which marks are made on the sheet metal by burning the paint locally with a plasma jet sheathed in a jet of cooling water. It will, however, be understood that this process is limited to marking coated sheet metal and cannot be applied to all types of sheet metal, that is to say irrespective of whether they are coated. Furthermore, according to this process, the upper surface of the sheet metal is not affected by the plasma jet, that is to say neither discoloured nor partially melted through its thickness, given that only the paint coating is burnt.

Other documents also propose processes for marking sheet metal. In this regard, mention may be made of documents U.S. Pat. No. 5,773,788, JP-A-62238020 or U.S. Pat. No. 5,760,363.

Document U.S. Pat. No. 5,760,363 proposes a plasma torch which can either cut or mark metal workpieces according to requirements.

However, several problems have not yet been resolved to date.

There is thus an industrial need to increase the productivity of marking and cutting or welding operations. This is because, at present, when it is necessary to carry out both cutting and marking, for example, on a workpiece such as sheet metal, the cutting is generally carried out first using a cutting torch located on a first support frame, then the plasma marking is carried out next using a marking torch located on a second support frame, and it is therefore essential to transfer the cut workpiece from the first support frame to the second support frame.

It is easy to see that, on the one hand, this entails significant encumbrance owing to the use of two support frames, as well as an installation for transferring workpieces from one frame to the other.

Furthermore, this type of installation requires each of the support frames to have its own means of moving the marking and cutting torches, of controlling the marking and cutting paths, and of positioning the torches, etc., and it will be easily understood that this, on the one hand, increases the complexity of the installation and, on the other hand, significantly increases its cost.

What is more, in this case, the operation of the two torches needs to be generated by different programmes independent of one another.

Put another way, with this type of installation, the problem arises of automating the marking and sequencing it in the overall manufacturing process, in particular sequencing it in relation to the prior or subsequent cutting and/or welding of the workpieces. This means that the machine or installation for marking the workpieces needs to be integrated in the production line, upstream or downstream of the cutting and/or welding installation; and to be managed, preferably, by the means for controlling and/or operating the overall installation, so as to make it start and stop at the appropriate time; to be secured, as regards the marking head proper, with the structure supporting the plasma-trimming torch in order to make it possible, preferably, to use the same drive shafts as those of the trimming and/or welding torch (es), and thus benefit from one-off management of the axes by the drive control means, such as a numerical control system, so as to obtain the same positioning accuracy.

SUMMARY OF THE INVENTION

The object of the present invention is thus to provide a combined process and automatic installation for obtaining, on the one hand, cutting and/or welding and, on the other hand, plasma marking of one or more workpieces to be processed, in particular metal workpieces, which do not have the drawbacks and problems mentioned above, so as to allow not only cutting and welding of the said workpiece or workpieces but also effective marking of the workpieces, which can be applied to coated or uncoated metal workpieces, or even to other types of materials, such as plastics.

In other words, the present invention is intended to simplify known installations in order to allow significant productivity gains by virtue of an installation and a process combining marking and cutting or welding of the workpiece or workpieces, these operations being managed automatically and, preferably, by the same programme, so that the number of operations of handling the workpieces is reduced, transfers from one frame to another are no longer necessary, and accurate positioning of the workpieces which have been cut and need to be marked is improved.

The solution provided by the present invention is based, in particular, on a combined arrangement of the marking and cutting or welding torches on a single frame, which thus makes it possible to reduce the encumbrance of the overall installation and its complexity, in particular by employing common drive means for the two torches, as well as a common management programme for them.

The invention therefore relates to a combined automatic installation for plasma-jet marking and for cutting and/or welding at least a part of at least one workpiece to be marked and/or cut and/or welded, comprising:

at least one carrying structure, that is to say a support frame, carrying at least one plasma-marking torch and at least one cutting and/or welding torch, drive means capable of moving, preferably simultaneously or in a synchronized manner, at least the said plasma-marking torch and at least the said cutting and/or welding torch in at least one direction of motion; preferably in several directions or axes of motion, in particular along at least three orthogonal axes (X, Y, Z), coolant supply means capable of supplying at least the said plasma-marking torch and at least the said cutting and/or welding torch with at least one coolant, such as demineralized water, gas supply means capable of supplying at least the said plasma-marking torch and at least the said cutting and/or welding torch with at least one gas; the term gas is intended to mean either a single gas compound or a mixture of several gas compounds, electric-current supply means capable of supplying at least the said plasma-marking torch and at least the said cutting and/or welding torch with electric current, and control means capable of initiating at least one movement of the said plasma-marking torch and of the said cutting and/or welding torch relative to the said at least one workpiece to be marked and cut and/or welded.

As the cutting and/or welding torches, use may be made of torches for cutting and/or welding using a plasma jet or a laser beam, or oxycutting torches and the like. A plasma-cutting torch is preferably used.

Depending on the case, the combined installation according to the invention may comprise one or more of the following characteristics:

the control means are capable of controlling the said drive means so as to make it possible to move, preferably in a synchronized manner or simultaneously, at least the said plasma-marking torch along at least one path defining at least one part of the mark to be made on the said workpiece and/or at least the said cutting and/or welding torch along at least one cutting path and/or at least one path corresponding to a welding plane of the said at least one workpiece, the control means are capable of furthermore initiating at least one start and/or stop of the coolant, electric-current and/or gas supply to at least the said plasma-marking torch, and/or at least one start and/or stop of the coolant, electric-current and/or gas supply to at least the said cutting and/or welding torch, the control means are capable of controlling the said drive means in order to move the said plasma-marking torch and/or the said cutting and/or welding torch in several directions of motion, in particular in translation and/or rotation, the said drive means are motorized, the said drive means preferably comprising at least one electric motor and, optionally, at least one position encoder and/or at least one tacho generator, it furthermore has sensing means capable of allowing at least one determination of at least one parameter representing the distance separating the plasma-marking torch and/or the cutting and/or welding torch from a workpiece to be marked and/or cut and/or welded, and preferably, adjusting the said distance as a function of a parameter representing a desired distance value, it furthermore has workpiece-support means for carrying and/or holding, at least temporarily, at least one workpiece to be marked and/or cut and/or welded, it furthermore has means for delivering at least one workpiece to be marked and/or means for removing at least one marked workpiece, at least one cutting and/or welding torch and at least one plasma-marking torch are carried by the same moving subunit of the said carrying structure, the plasma-marking torch and/or the cutting and/or welding torch are selected from single- or double-flow plasma torches, the cutting and/or welding torch is selected from laser-welding or cutting torches and oxycutting torches, it furthermore has fume-extraction means and/or waste disposal means.

the control means comprise numerical-control means, the plasma-marking torch and/or the cutting and/or welding torch are mounted on means with rails for moving the said marking torch and/or cutting and/or welding torch towards and/or away from the upper surface of at least one workpiece to be processed.

The invention furthermore also relates to a combined automatic process for marking and cutting at least one workpiece, in particular at least one metal workpiece, using at least one plasma-marking torch delivering at least one plasma-marking jet and at least one plasma-cutting torch delivering at least one plasma-cutting jet, comprising the following steps:

(a) supplying at least one plasma-marking torch with at least one electric current and with at least one plasma gas, and generating at least one plasma-marking jet having a marking energy greater than or equal to a first energy threshold and less than a second energy threshold, the said first energy threshold corresponding to the minimum energy required to obtain at least one local change in coloration of the workpiece to be marked, and the said second energy threshold corresponding to the energy required to obtain complete melting through the full thickness of the said workpiece to be marked, (b) supplying at least one plasma-cutting torch with at least one electric current and at least one plasma gas, and generating at least one plasma-cutting jet having a cutting energy greater than or equal to the said second energy threshold corresponding to the energy required to obtain complete melting through the full thickness of the said workpiece to be cut, (c) plasma-jet marking the said workpiece to be marked by subjecting at least one part of the said workpiece to at least the said plasma-marking jet having the said marking energy, and (d) plasma-jet cutting the said workpiece to be cut by subjecting at least one part of the said workpiece to at least the said plasma-cutting jet having the said cutting energy.

To do this, marking energies corresponding to powers of from 400 watts for the minimum energy to 4000 watts for the maximum energy may be used, but marking of energies corresponding to powers of from 500 watts to 2000 watts are preferentially selected.

If need be, the person skilled in the art can adjust or control the marking energy to be used or the power to be delivered in order to allow effective and adequate marking, in particular according to the nature and thickness of the material to be marked and according to the depth and the width of the marking to be made or the discoloration to be obtained. It is therefore clear, that in certain cases, the powers to be employed may be more than the ranges of values mentioned above or, conversely, less than these values.

The invention furthermore also relates to a combined automatic process for marking and welding at least one workpiece, in particular at least one metal workpiece, using at least one plasma-marking torch delivering at least one plasma-marking jet and at least one welding torch delivering at least one welding gas flow, comprising the following steps:

(a) supplying at least one plasma-marking torch with at least one electric current and with at least one plasma gas, and generating at least one plasma-marking jet having a marking energy greater than or equal to a first energy threshold and less than a second energy threshold, the said first energy threshold corresponding to the minimum energy required to obtain at least one change in coloration of the workpiece to be marked, and the said second energy threshold corresponding to the energy required to obtain complete melting through the full thickness of the said workpiece to be marked, (b) supplying at least one welding torch with at least one electric current and at least partially melting through the thickness of the said at least one workpiece to be welded, (c) plasma-jet marking the said workpiece to be marked by subjecting at least one part of the said workpiece to at least the said plasma-marking jet having the said marking energy.

Depending on the case, the combined marking process according to the invention may comprise one or more of the characteristics given below:

the plasma marking of the said workpiece to be marked is carried out along a predetermined marking path defining the marking to be made, the plasma-jet marking of the said workpiece is carried out prior to the plasma-jet cutting of the said workpiece.

A marking process or installation according to the invention can be used in an operation of marking and cutting or welding metal workpieces, that is to say ones made of metal or metal alloys, in particular workpieces made of aluminium or aluminium alloys, construction steels or stainless steels or, depending on the case, in an operation of marking and cutting workpieces made of polymer material, such as plastic workpieces.

BRIEF DESCRIPTION OF THE DRAWINGS

The invention will now be described in more detail with the aid of the appended figures given by way of nonlimiting illustration.

DETAILED DESCRIPTION OF THE INVENTION

Figure 3:
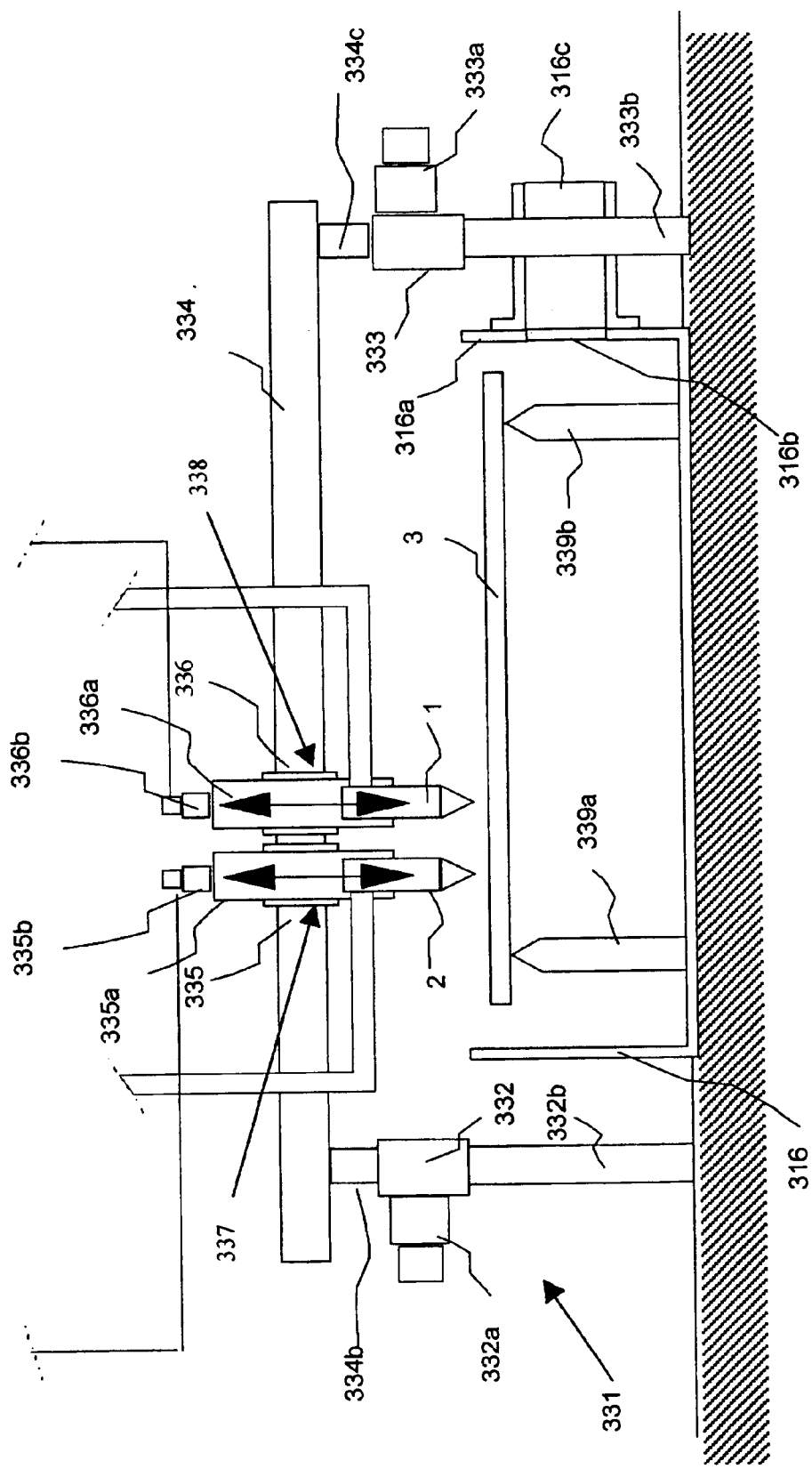
FIG. 3 represents a diagram of a combined automatic installation for plasma marking/cutting.

FIG. 3 represents a diagram of a combined automatic installation 331 for plasma marking/cutting of metal workpieces 3, such as sheets of stainless steel, which is equipped, on the one hand, with a station 337 for plasma trimming of the metal workpieces 3, comprising a plasma-cutting torch 2 and, on the other hand, a station 338 for plasma marking of the said metal workpieces 3, comprising a plasma-marking torch 1, the plasma-marking station 338 being located downstream of the plasma-trimming station 337.

This arrangement is not, however, intended to imply any limitation, and a combined installation whose plasma-marking station 338 is located upstream of the plasma-trimming station 337, or an installation composed, for example, of a plurality of plasma-trimming stations 337 and/or plasma-marking stations 338 would therefore also fall within the scope of the present invention.

The same is true as regards a combined plasma-marking/welding installation equipped, on the one hand, with a welding station comprising a welding torch, such as a plasma-welding torch, and, on the other hand, with a plasma-marking station or, alternatively, a combined hybrid installation for plasma marking/welding/cutting, having at least one welding torch, at least one cutting torch and at least one plasma-marking torch.

The cutting torch 2, here a conventional type of plasma-cutting torch, and the way in which it operates, will not be described in detail below given that such plasma-cutting torches have already been described in many documents in the prior art. For example, one plasma-cutting torch that may be used here is described in detail in document EP-A-599709 in the name of the Applicant Company, which is incorporated here by reference.

Furthermore, the plasma-marking torch 1 used may be of the single-flow type, that is to say a torch dispensing only one gas flow, namely the plasma jet used for marking the workpiece, or of the double-flow type, that is to say a torch dispensing several gas jets, namely a central plasma jet used for marking the workpiece, which central plasma jet is jacketed by a peripheral gas flow forming a shielding gas sleeve around the said central plasma jet.

In the case of a marking torch 1 of the double-flow type, the second flow, that is to say the shielding peripheral flow, contributes to improving the stability of the plasma jet as it travels between the torch and the workpiece to be marked, as well as to increasing the power density deposited on the workpiece by cooling the peripheral layer of the central jet, by reducing the cross section of ionized gas and by increasing the constriction of the electric arc.

Furthermore, the plasma-marking torch 1 may also be designed to operate in a first operating mode referred to as "non-transferred arc", or else referred to as "blown arc", alternatively according to a second operating mode referred to as "arc transferred" to the workpiece.

In the "blown arc" mode, the electric current flows, within the plasma-marking torch 1, between the cathode and the nozzle forming the anode, and the plasma jet is blown by the plasma gas flow through the outer orifice of the nozzle and thus forms a thin jet of plasma discharges at high temperature stretching out towards the workpiece to be marked.

The marking is thus obtained by coloration or, where appropriate, discoloration of the surface of the material by thermal and/or chemical effect, substantially without removing or depositing material, that is to say the said plasma jet locally heats the surface of the workpiece to be marked and, by chemical reaction with the ambient air, coloured oxides are formed whose colour intensity depends on the temperature reached during the chemical reaction taking place with the oxygen in the ambient air.

In other words, the width and the intensity of the marking will depend, in particular, on the rate of movement of the marking torch 1, the nature of the plasma gas used and the strength of the electric current consumed in the torch.

By way of example, marking lines or marks with a width of 0.5 to 1.5 mm and a coloration ranging from light yellow to deep black, with orange, blue and brown shades in between, have thus been obtainable.

Marking in "blown arc" mode is particularly well-suited for stainless steels, and also for construction steels with a pickled surface, and light alloys, in particular when the thicknesses are small, for example about 0.2 to 10 mm, or weakening of the mechanical characteristics of the construction workpieces to be marked is precluded.

Next, if need be, the marks thus made can be erased or, at least, made less strong by a suitable chemical treatment.

In contrast, in the "arc transferred" to the workpiece mode, the electric current flows between the cathode of the torch and the workpiece to be marked, forming the anode, so that almost all the electrical and thermal energy of the plasma jet is deposited on the workpiece to be marked.

The marking of the workpiece is therefore obtained by removal of material, that is to say by forming a groove at the surface of the said workpiece to be marked, the width and the depth of which will depend on the rate of movement of the marking torch 1, the type of plasma gas used and the strength of the electric current supplying the said workpiece.

By way of example, marking grooves with a width of 0.5 to 1.5 mm and a depth of from a few $\frac{1}{100}^{ths}$ of a millimeter to about 1 mm were thus obtainable.

Marking in "transferred-arc" mode is therefore particularly well-suited not only for construction steels with unpickled sheet-metal surface, but also for stainless steels and light alloys so long as the material is thick enough, for example with a thickness of about 2 mm to 150 mm, and the grooves do not significantly weaken the mechanical strength of the construction elements thus treated.

In general, the marks made using this process are not erasable, or can be erased only at the cost of removing material by mechanically re-surfacing the marked workpiece.

Figure 4:
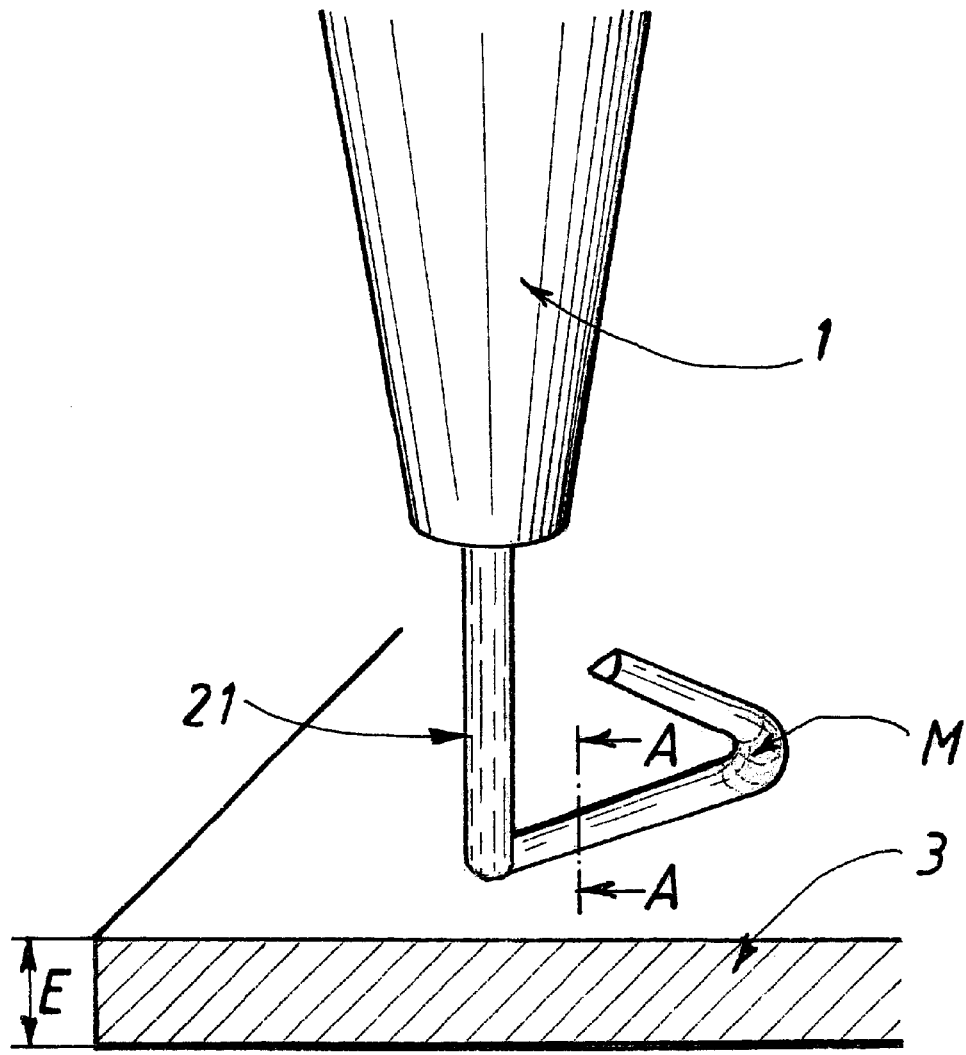
FIG. 4 illustrates plasma marking in "transferred arc" mode.
Figure 5:
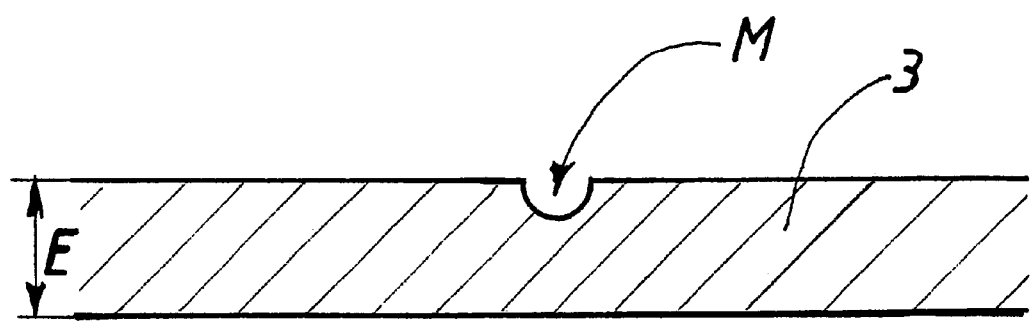
FIG. 5 is a view in section along plane A—A of FIG. 4.

Marking in "transferred-arc" mode is illustrated in FIGS. 4 and 5, which schematize an operation of plasma marking a metal workpiece 3 in which a plasma jet 21 delivered by a plasma-marking torch 1 makes it possible to obtain the desired marking M while making a groove on the upper surface of the workpiece 3.

FIG. 5, which is a view in section on the plane A—A in FIG. 4, clearly shows that the marking M was obtained by partial melting through the thickness E of the workpiece 3 to be marked.

The width and the depth of the groove forming the marking M depend, in particular, on the rate of movement of the marking torch 1, the type of plasma gas used and the strength of the electric current supplying the said workpiece.

Figure 1:
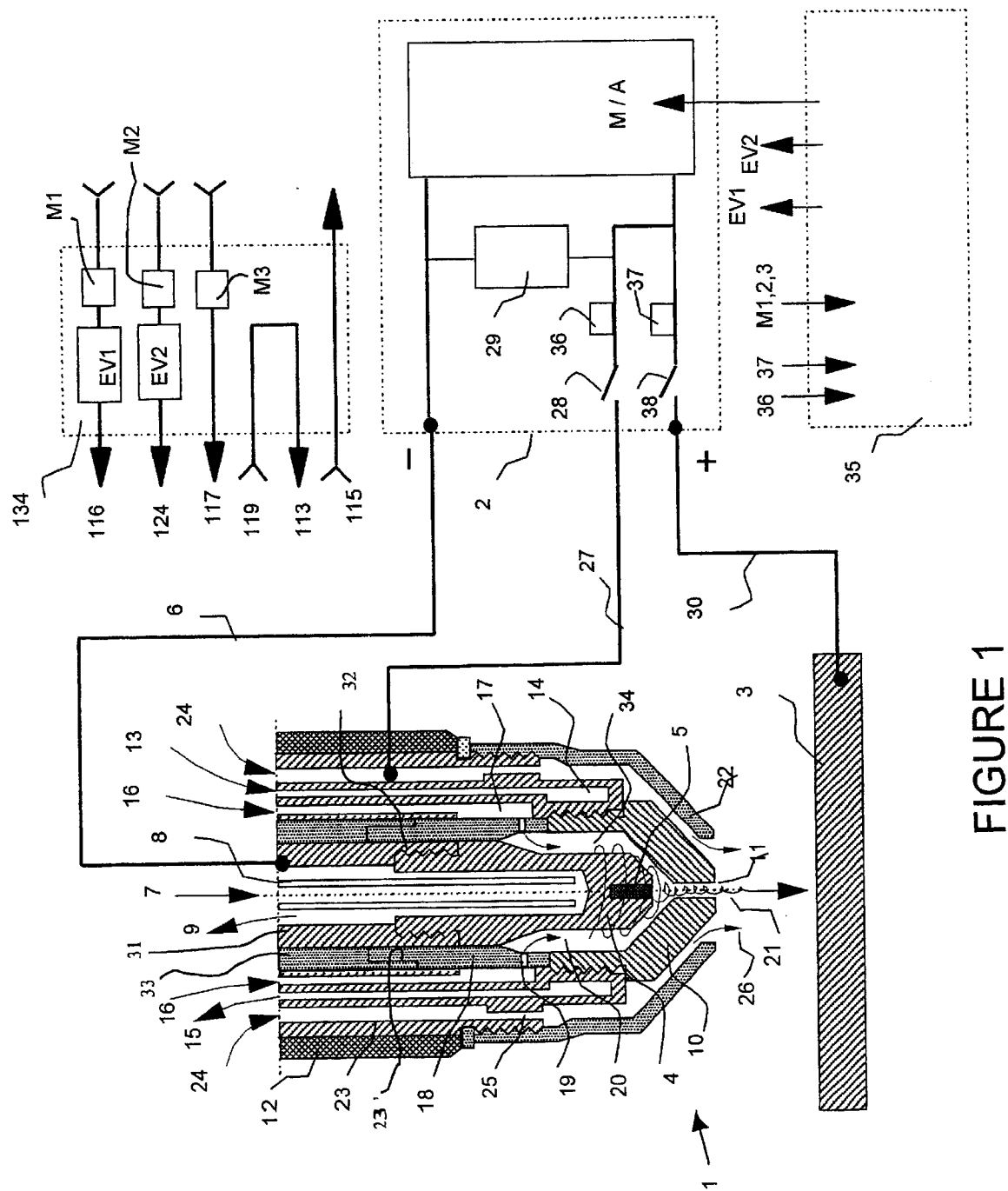
FIG. 1 shows a plasma torch in partial longitudinal section.

Furthermore, FIG. 1 describes, as an example, a double-flow plasma-marking torch 1 operating according to a marking mode of "blown arc" or of "arc transferred" to the workpiece.

More precisely, FIG. 1 shows that the plasma-marking torch 1, represented in partial longitudinal section, is composed of an electrode formed by an electrode body 4, for example made of copper or a copper alloy, into which an emissive insert 5 is inserted, generally made of hafnium for operation under an oxidizing plasma gas, or of pure or alloyed tungsten for operation under a nonoxidizing plasma gas.

The upstream part of the electrode body 4 is fixed in leaktight fashion, for example by screwing 32, to a support or electrode holder 31, made for example of copper alloy, which electrode holder 31 is furthermore connected to the negative pole (−) of a DC source 2, such as an electric-current generator, by means of a suitable connection means, such as an electrical connection cable 8 or the like.

A coolant 7, such as demineralized water or another fluid especially designed for such use, intended to provide cooling by heat exchange on contact with the electrode body 4 and the emissive insert 5, runs through the electrode body 4, in particular travelling through a dip tube 8, before being discharged through a peripheral passage 9 bounded, on one side, by the external wall of the said dip tube 8 and, on the other side, by the internal wall, on the one hand, of the electrode body 4 and, on the other hand, of the electrode holder 31.

The electrode holder 31 and the electrode 4, 5 are concentrically surrounded by a main torch body 23, which is made for example of a copper alloy, while they are electrically insulated from it by at least one piece of insulating material 33, such as a plastic polymer material or a ceramic, forming a sheet or sleeve and used as a guide for aligning the said electrode holder 31 and the said main body 23.

The main torch body 23, which includes an internal chamber 14, has two functions: on the one hand that of allowing a coolant, for example demineralized water, to flow inside an internal chamber 14 between an injection zone or inlet site 13 and a discharge zone or outlet site 15, and on the other hand that of supplying the plasma chamber 17, then an arc chamber 34 located downstream, with a plasma gas flow from an inlet 16 for supply of the said plasma gas.

The downstream end of the torch 1 furthermore has a nozzle 10, made for example of a copper alloy, provided with a central orifice 11 for ejecting the plasma jet 21, which nozzle 10 is fixed, for example screwed, onto the downstream end of the said main body 23, coaxially with the electrode 4, 5 and while being separated from it in such a way as to define the arc chamber 34, the said arc chamber 34 having an axisymmetric section decreasing progressively approaching the ejection orifice 11.

An internal partition 18, of cylindrical general shape, made of an insulating material, for example a ceramic, is fixed in a leaktight fashion, on the one hand, onto the rear end of the nozzle 10, and, on the other hand, onto an interior bore 23' of the torch body 23, forming the interior wall of the plasma chamber 17.

At least one orifice 19 for the plasma gas to pass through is drilled in the internal partition 18 so as to create a gas flow with preferentially turbulent flow in the arc chamber 34.

Furthermore, an external duct 22 is fixed to the torch body 23, peripherally and concentrically with the nozzle 10 for ejecting the plasma jet.

The torch body 23 also has a supply section or inlet 24 for a shielding gas flow 26 to pass through, the flow being distributed peripherally and concentrically with the plasma gas jet 21 or plasma jet.

Advantageously, the said shielding gas flow 26 is dispensed by means of calibrated orifices 25, distributed in a ring in the torch body 23, so as to distribute the said shielding gas in an axial or turbulent flow, for example with the same sense of rotation as the plasma flow, in the space bounded by the internal wall of the external duct 22 and the external wall of the nozzle 10.

In order to avoid accidental electrical contact between a metallic element of the machine and the torch, a covering layer 12 of insulating material, such as a plastic polymer material, is deposited on the entire periphery of the main body 23 and electrically insulates the said main torch body 23. A similar coating, or at least one having similar electrical insulation properties, may also cover the exterior surface of the duct 22.

Furthermore, a suitable connection means, such as an electrical connection cable 27, connects the torch body 23 to the positive pole (+) of the DC source 2, so as to make it possible to supply the plasma-marking torch 1 with electric current, and consequently the nozzle 10, and thus make it possible to establish and sustain the electric arc essential for obtaining a plasma jet 21 capable of carrying out effective marking of the workpiece 3 to be marked.

To do this, the workpiece 3 to be marked is arranged at a determined distance under the tip of the marking torch 1, the said workpiece 3 to be marked also being connected by an electrical cable 30 or a similar means to the positive pole (+) of the current source 2.

A high-voltage and high-frequency auxiliary electricity source 29 is connected between the positive (+) and negative (−) terminals of the source 2 supplying the connection means 27 and 6.

A first means with cut-off contact 28 and a device 36 for monitoring the flow of current, of the current relay type, are arranged on the connection means or supply cable 27 supplying the nozzle 10.

Similarly, a second cut-off contact 38 and a second device 37 for monitoring the flow of current, also of the current relay type, are arranged on the electrical-current connection means 30 of the workpiece to be marked.

Furthermore, a subunit 134 groups together the systems for control and sequential actuation of the various fluids supplied to the marking torch 1, in particular the plasma gas, the shielding gas and the coolant or coolants.

The subunit 134 thus includes a solenoid valve EV1 and a pressure controller M1 on the plasma-gas supply line 116 (connected to the supply input 16), a solenoid valve EV2 and a pressure controller M2 on the shielding-gas supply line 124 (connected to the supply input 24), a pressure controller M3 on the coolant supply line 117 (connected to the supply inlet 7), as well as circuits 119, 113 and 115 supplying the various parts of the torch 1 with coolant (which are respectively connected at 9, 13 and 15), as explained above.

The current source 2 and the subunit 134 are connected to and controlled by control means 35, referred to as the control manager 35, which deliver the sequential instructions for effective operation and control of the plasma-marking installation.

Conventionally, means for storing the plasma and shielding gases, for example pressurized gas cylinders, provided with means for adjusting and regulating pressure, are placed upstream of the subunit 134 and are connected, by supply pipes or the like, to the marking torch 1 via the said supply lines 116 and 124, respectively.

Similarly, means for supplying coolant, for example water carried by the mains or output by a stand-alone refrigeration unit, are connected to the marking torch 1 via the said supply lines 117 and 113, respectively.

The coolant discharge lines 115 and 119 return the heated coolant leaving the torch 1 to, for example, a drain or, where appropriate, to the stand-alone refrigeration unit.

The operation of the plasma-marking torch 1 in "blown-arc" mode and, when appropriate, in "transferred-arc" mode will be successively described in more detail below, with reference to FIG. 1.

In "blown-arc" mode, at the instruction of the control means 35, that is to say the control manager 35, and after checking the availability of electricity from the current source 2 and that the various fluid circuits 134, 116 and 124 are being supplied properly by the pressure controllers M1, M2 and M3, the following sequences take place:

the solenoid valve EV1, supplied with plasma gas at the required pressure, opens and thus makes it possible to supply the marking torch 1 with plasma gas and to create a nonionized plasma gas flow leaving through the orifice 11 of the nozzle 10;

the cut-off contact 28 closes, the cut-off contact 38 opens and the current source 2 delivers an electric current whose strength corresponds to the nature of the marking to be carried out, for example a current of about 4 A to 30 A, or a current value less than the marking current;

the auxiliary source 29 is also turned on;

a high-frequency (HF) spark then jumps between the end of the electrode 4, 5 and the end of the nozzle 10;

ionization of the plasma gas by the (HF) spark then occurs, which creates an electrical path favourable to establishing an electric arc with a preselected current strength between the end of electrode 4, 5 and the end of the nozzle 10;

the turbulent plasma gas flow pulls, on the one hand, the cathode foot of the arc towards the centre of the end of the emissive insert 5 of the electrode 4, 5 and, on the other hand, the anode foot of the electric arc towards the channel or orifice 11 of the nozzle 10;

the plasma arc stabilized in this way extends outside the orifice 11 of the nozzle 10 and forms a fine jet of discharges or plasma jet 21 at high temperature, for example at a temperature close to the melting temperature of the material to be processed, which flows in the direction of the workpiece 3 to be marked and can fulfil its function of marking the workpiece 3;

the current detector 36 then delivers information confirming that the electric arc has actually been struck to the control manager 35;

optionally, the control manager 35 can then give the order to open the solenoid valve EV2 for supplying shielding gas, adjusted to a predetermined required pressure, for example a pressure of at least $1.5 \times 10^5$ Pa;

the marking operation proper can then start, through the intervention of the control manager 35, which controls the various components and actuators in order, on the one hand, to lower the marking torch 1 and hold it at a suitable and appropriate distance above the workpiece 3 to be marked and, on the other hand, to move the said torch 1 in order to describe the programmed paths;

at the end of the marking programme, and depending on the option selected, the control manager 35 can either lift the marking torch 1 back up rapidly in order to place it at a distance such that the plasma jet 21 no longer influences the workpiece 3 to be marked and/or move the torch 1 to a new marking-programme origin, for example with a view to marking another workpiece to be marked, and then commence the running of this programme after having returned the marking torch 1 to a suitable distance from the new workpiece to be marked, or, where appropriate, quench the plasma arc by turning off the current source 2 and closing the solenoid valves EV2 then EV1.

In the "arc transferred" to the workpiece 3 mode, the turning-on of the marking torch 1 starts with sequences identical or similar to the sequences of the "blown-arc" mode.

Here again, the first step thus involves striking a first blown arc, constituting what is then referred to as a pilot arc, which has a current strength value generally lower than that required for the marking arc 21 after transfer to the workpiece 3. The subsequent sequences are then as follows:

the cut-off contact 38 closes;

after receiving the information from the current detector 36 and optionally running the aforementioned optional sequence, the control manager 35 sends an instruction to the lowering actuator to lower the plasma-marking torch 1 so as to bring the plasma jet 21 into contact with the workpiece 3 to be marked;

when a sufficiently ionized region of the plasma jet 21 reaches the workpiece 3, a current delivered by the source 2 with a current value identical to that of the pilot arc can then be delivered from the electrode 4, 5 to the workpiece 3. For its part, the current detector 37 then delivers information about the flow of current, and this is followed by an instruction to open the cut-off contact 28. The strength of the current may then optionally be increased in order to reach the preselected marking current value, for example at least 4 A;

the marking sequence proper can then start through instructions from the control manager 35 to the various actuators in order to hold the torch 1 at a suitable distance above the surface of the workpiece 3 to be marked and move the torch 1 as required in order to describe the programmed paths and thus carry out the marking to be made;

at the end of the marking programme and, depending on the option selected, the control manager 35 can either close the cut-off contact 28 and, simultaneously, open the cut-off contact 38, and where appropriate reduce the current strength to return to a pilot-arc phase, then raise the torch 1 back up rapidly in order to place it at a distance such that the plasma jet no longer influences the workpiece 3, move the torch 1 to a new marking-programme origin and again run this programme, after having returned the torch 1 to a suitable distance from the workpiece 3 to be marked, or, conversely, entirely quench the plasma arc by turning off the current source 2 and closing the solenoid valves EV2 then EV1.

Such a plasma-marking torch 1 can be used equally well in an overall installation which does not have a station for prior or subsequent cutting or, conversely, in an overall installation which does have such a station for prior or subsequent plasma cutting; the latter case is referred to as a combined plasma-cutting and -marking installation.

Figure 2:
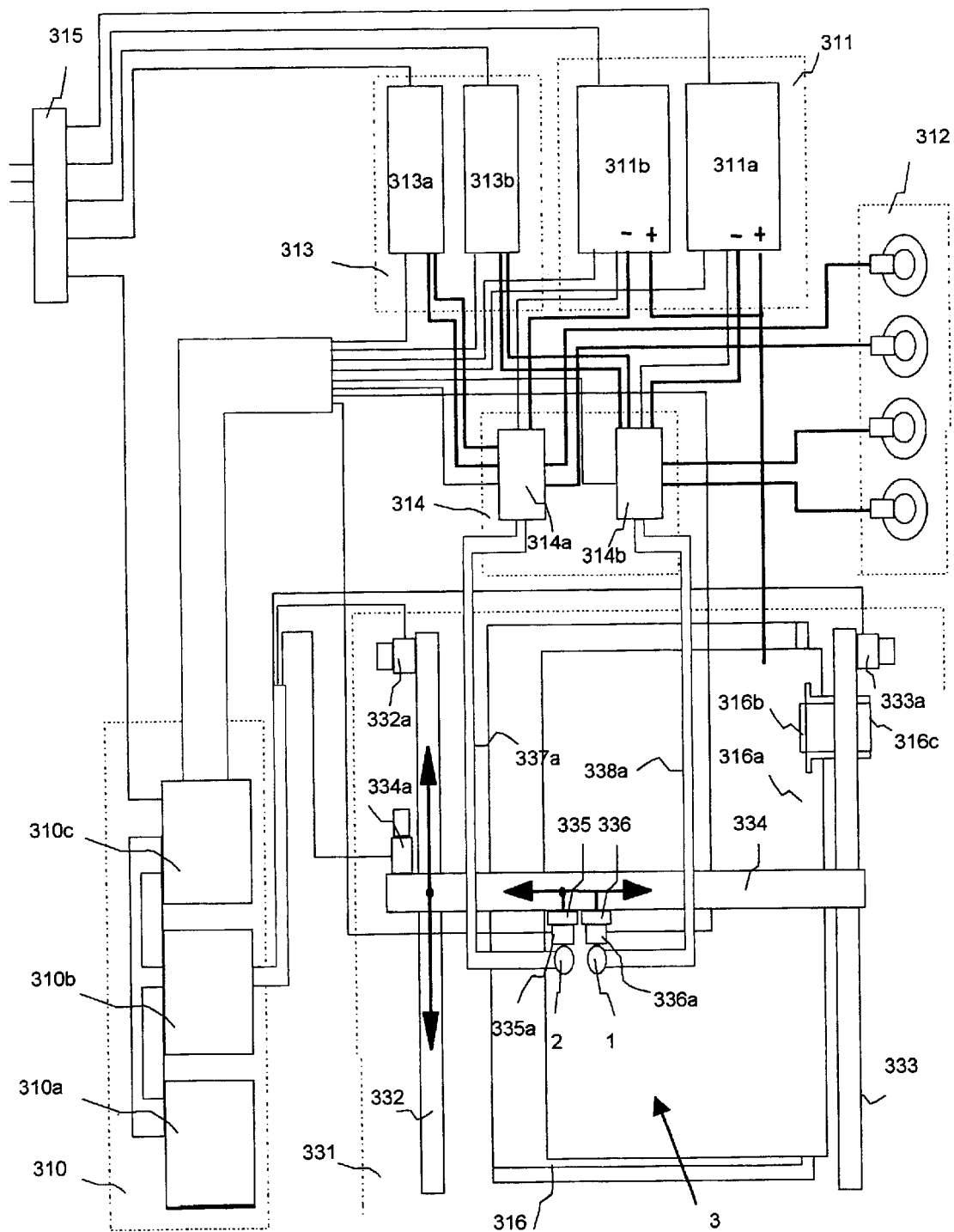
FIG. 2 shows an installation combining a plasma-cutting station, a plasma torch, a plasma marking station, and a plasma marking torch.

An installation combining a plasma-cutting station 337 comprising a plasma-cutting torch 2 and a plasma-marking station 338 comprising a plasma-marking torch 1 is schematically represented in FIGS. 2 and 3.

It comprises several subassemblies, namely, in particular: a machine 331 for processing workpieces, in particular metal workpieces; means for sequential control, adjustment and actuation of the gases 314; means 313 for cooling the plasma torches 1 and 2; means 312 for supplying gas to the plasma torches 1 and 2; means 311 for supplying power to the plasma torches and to the control means 310, for example a control manager 310.

More precisely, the processing machine 331, which is here of X-Y type, has a gantry chassis structure 334 and is designed to drive the plasma-cutting 2 and plasma-marking 1 torches at the desired working speed or speeds, for example at a speed of about 10 m.min$^{-1}$.

The processing machine 331 is composed of two parallel shafts 332 and 333 which form longitudinal beams and are each provided with a drive system comprising an electric motor assembly with a position encoder and a tacho generator, these drive systems being commonly referred to as actuators 332a and 333a.

The two parallel shafts 332 and 333 carry, via two struts 334b and 334c, a third shaft 334 forming a transverse beam, which third shaft 334 is orthogonal to the longitudinal shafts 332 and 333 and also has a motor assembly with a position encoder and a tacho generator, namely the actuator 334a.

Since the shaft 334 is secured to the motorized slides 332a and 333a of the shafts 332 and 333, when these slides move simultaneously and at the same speed, they carry along the said shaft 334 as they move, so that it still remains in a direction orthogonal to that of the said shafts 332 and 333.

All the shafts 332, 333 and 334 are controlled or driven so that the shaft 334 moves in a plane generally parallel to the floor.

Two shields 335 and 336 are secured to the motorized slide of the shaft 334, which then, when it moves, displaces the said shields 335 and 336 along a path parallel to the shaft 334. It will therefore be understood that, when the movements of the three shafts 332, 333 and 334 are combined, the said shields 335 and 336 are made to describe a path whose geometry may be varied greatly.

A vertically displaceable rail 335a is fixed to the shield 335 so that its axis of movement is orthogonal to that of the shaft 334.

Fixed to the moving slide of the rail 335a is a plasma-cutting torch 2 whose vertical axis, on the one hand, coincides with the axis of the plasma-cutting jet which it delivers and, on the other hand, is parallel to the axis of movement of the rail 335a, so as to make it possible to move the plasma-cutting torch 2 away from or, conversely, towards the workpiece 3 to be cut, and thus place it at an appropriate distance from the said workpiece 3.

Furthermore, a second vertically displaceable rail 336a is fixed to the second shield 336 so that its axis of movement is itself also orthogonal to that of the shaft 334.

In a manner similar to that above, fixed to the moving slide of the rail 336a is a plasma-marking torch 1 whose vertical axis coincides with the axis of the plasma-marking jet which it generates and, furthermore, is parallel to the axis of movement of the rail 336a, so as to make it possible, as before, to move the plasma-marking torch 2 away from or, conversely, towards the workpiece 3 to be marked and thus place it at a suitable distance from the said workpiece 3 in order to perform effective marking of the latter.

It should be noted that each of the rails 335a and 336a is also provided with an electric motor assembly with tacho generator and, optionally, position encoder.

A bundle of electrical wires connects the actuators 332a, 333a, 334a of the shafts 332, 333 and 334, respectively, as well as their respective tacho generators and position encoders, to the control means, namely the control manager 310, which manages the start/stop sequences, controls the rates of movement of the various shafts, and also their positions according to a programme defining pre-established paths.

The actuators 335b and 336b of the shafts 335a and 336a, respectively, as well as their respective tacho generators and, optionally, position encoders are also connected to the control manager 310, which also manages the start/stop sequences, controls the rates of movement of the various shafts and also, optionally, their positions according to the programme of pre-established marking and trimming sequences.

The marking 1 and trimming 2 torches are held at a substantially constant distance from the plane formed by the upper surface of the sheet metal 3 using a sensing system of the type slaved to the arc voltage between the cathode and the anode, that is to say one whose operating principle is based on measuring the arc-voltage values of each of the torches 1 and 2, and comparing these measured values with pre-established target values, and, on the basis of this comparison, moving the shafts 335a and 336a carrying each of the torches 1 and 2 so as to obtain a change in the arc lengths and therefore a change in the distance separating the torches 1 and/or 2 from the sheet metal 3 to be processed, until measured values of arc voltage identical or not significantly different from the pre-established target values are obtained. Other means for controlling the distance between the torches 1 and 2 and the workpiece 3 may be employed, for example mechanical or capacitive sensors.

A metal sheet 3 to be marked and trimmed is placed under the shaft 334 and between the shafts 332 and 333, bearing on multiple support points, for example the support points formed by a sheet-metal support rig, that is to say the support means 339a and 339b for the workpiece 3.

The position of these various support points 339a, 339b is determined in such a way that the surface of the sheet metal 3 is preferably placed in a plane substantially parallel to the plane in which the shaft 334 moves.

The sheet metal 3 and/or the sheet-metal support rig, that is to say the support means 339a and 339b, are connected via electrical cables to the positive poles (+) of the two current generators 311a and 311b.

In addition, a container 316, here of parallelepipedal shape and having an open upper face giving access to the upper surface of the sheet metal 3 to be cut and marked, surrounds the sheet-metal support rig 339a, 339b so that the volume thus formed can collect the slag and other incandescent spray generated by the operation of plasma cutting the sheet metal 3.

In order to keep the workspace clean, one of the side faces 316a of the container 316 is pierced with at least one orifice 316b provided with a tubular sleeve 316c intended to hold a tubular extraction sheath (not shown) connected to an extraction unit (not shown) placed some distance away, so that the internal volume of the container 316 is connected to the said extraction unit.

Thus, when these extraction means are running, a vacuum is created in the container 316, via the extraction sheath, the connection sleeve 316c and the orifice 316b pierced in the side face 316a of the container 316, thus creating an extraction gas flow circulating from the container 316 to the extraction unit, and the fumes produced, in particular during the plasma-cutting step and primarily under the sheet metal 3 undergoing trimming, can then be carried off by the effects of the extraction gas flow to the extraction unit, which itself discharges them through another tubular sheath to outside the workshop, or sends them into a reprocessing site, such as a filtration system. It is in fact recommended to purify the cutting fumes by passing them through a filtration system, containing for example one or more filters, before discharging them to the atmosphere.

Furthermore, it is also possible to provide complementary extraction means for the fumes produced above the sheet metal 3, during trimming or during marking.

Moreover, the control manager 310, which is connected to a general electric current supply 315, here includes three main subunits, namely a numerical control mechanism 310a, all these supply means 310b for the shaft actuators and all the electronic or electrical automation means 310c delivering and receiving the signals capable of activating and controlling the various constituent components of the installation; these three subunits being connected together by means for communicating logic, digital or analogue signals.

The numerical control mechanism 310a comprises a control screen and a panel for activating the various functions, namely the functions of programming the geometrical profiles of the workpieces to be marked and trimmed, as well as the sequences of striking and quenching the plasma jets, and the functions of simulating tool runs, moving the shafts, engaging and stopping the working cycles, as well as safeguarding the entire installation using an emergency stop device, for example.

The set of supply means 310b for the shaft actuators furthermore has, in particular, speed variators and regulators, and devices for decoding the shaft-position information.

Furthermore, means 311 for supplying power to the plasma-marking torch 1 and plasma-cutting torch 2 are made up of a first DC generator 311a and a second DC generator 311b.

More precisely, the first DC generator 311a, for example of the inverter type, can be adjusted from 0 to 60 A and is dedicated to supplying electric current to the plasma-marking torch 1. During the marking proper, the positive pole of the first generator 311a is connected to the sheet metal 3 to be marked, forming the anode, and the negative pole is connected to the electrode, forming the cathode, of the plasma-marking torch 1.

In addition, the second DC generator 311b, for example of the chopper type, can be adjusted from 0 to 300 A and is dedicated to supplying electricity to the plasma-cutting torch 2. During cutting, the positive pole of the generator is connected to the sheet metal 3 to be marked, forming the anode, and the negative pole to the electrode, forming the cathode, of the plasma-cutting torch 2.

Each of the two generators 331a and 311b is furthermore connected via cables or bundles of electrical wires, on the one hand, to a general electric-current supply 315 and, on the other hand, to the control manager 310 which delivers the instructions and other necessary information for selecting the working-power ranges to them, as well as to carry out the various phases of striking the arc at lower power, increasing the working power and quenching the arc by cutting off the power.

Other instructions and information may also be interchanged via the connection bundle, in particular information about measurement of the arc voltage, cutting the electricity supply for heat-related reasons, for example, which require the installation to be shut down for safety, etc.

According to another embodiment, it is also possible to use only a single current source, supplying the two torches alternately.

Furthermore, means 312 for supplying gas to the plasma-cutting torch 2 and plasma-marking torch 1 comprise means for storing a sufficient quantity of the gases and gas mixtures intended for feeding the plasma-cutting torch 2 and the plasma-marking torch 1, as well as means for adjusting and regulating their distribution pressure.

Conventionally, the nature and the composition of these gases or gas mixtures depends on the work to be carried out.

In other words, the plasma-marking operation may be carried out by using, on the one hand, a striking gas and, on the other hand, a marking gas, it being possible for the said striking gas to be, depending on the type of installation and marking torch used, of the same nature and/or composition as the marking gas, or conversely, of different natures and/or compositions.

Thus, the striking gas and the marking gas may both be argon or, conversely, the striking gas may be argon and the marking gas may be another gas, for example oxygen or nitrogen, or alternatively a mixture of several gas compounds, for example argon+hydrogen or nitrogen+hydrogen mixtures, or more simply compressed air.

In addition, for a plasma-marking torch 1 of the double-flow type, a shielding gas is also used, which may be compressed air or else, as before, a gas or mixtures of several gas compounds of the same nature and/or composition as those used as marking gas and/or striking gas.

Furthermore, the plasma-cutting operation may be carried out using a striking gas which, once again, depends on the type of installation and cutting torch 2 which are used, and which may also be of the same nature and/or composition as the cutting gas or, conversely, of different nature and/or composition.

For example, the striking gas may be argon and the cutting gas oxygen or compressed air, in the case of construction steels, or nitrogen or a nitrogen+hydrogen, argon+hydrogen or nitrogen+argon+hydrogen mixture, in the case of stainless steels and light alloys.

In addition, for a plasma-cutting torch 2 of the double-flow type, a shielding gas is also used, which may be compressed air or else, as above, a gas or mixtures of several gas compounds, such as a nitrogen+oxygen mixture in the case of construction steels, or nitrogen, or even $CO_2$, or a nitrogen+hydrogen, nitrogen+hydrocarbon, argon+hydrogen or argon+hydrocarbon mixture, in the case of stainless steels and light alloys.

The gases may be stored in pressurized cylinders or in cryogenic tanks or, alternatively, in the case of nitrogen+oxygen mixtures, produced on-site by air permeation using, for example, one or more membrane modules, such as a FLOXAL™ installation marketed by the company L'AIR LIQUIDE.

Furthermore, the means 313 for cooling the plasma torches 1 and 2 are composed here of a first cooling unit 313b and a second cooling unit 313a.

The first cooling unit 313b has a power tailored to the requirements of the plasma-marking torch 1, and the second cooling group 313b has a power tailored to the requirements of the plasma-cutting torch 2.

The two cooling units 313a and 313b are connected to the general electric-current supply 315 and are provided with safety systems and components for controlling the circulation of the fluids in order to allow the plasma-cutting/ plasma-marking installation to operate only if predetermined minimum values of pressure and/or flow rate are reached. For this purpose, the cooling units 313b and 313a are connected, via a bundle of electrical wires or the like, to the control manager 310 so as to obtain centralized management of all the safety information.

As a variant, it is possible to have only one cooling unit, that is to say a single unit, provided with two circuits, one for the plasma-marking torch 1 and the other for the plasma-cutting torch 2, and whose overall power is at least the sum of the powers needed for the requirements of the two plasma torches 1 and 2.

In the absence of stand-alone cooling units, it is also possible to use the municipal water mains.

However, whatever the solution used, in order to guarantee proper operation of the plasma torches 1 and 2 without risk of clogging their cooling circuits by mineral or metal deposits and damage by electrolysis effects between two walls at different electrical potentials, the water or the coolant are preferably demineralized and advantageously have a neutral pH, preferably between 6.5 and 8.3, a hardness of less than 10° and a resistivity of more than 100 kΩ/cm²/cm. Furthermore, the means for sequential control, adjustment and actuation of the gases 314 include a first subunit 314a and a second subunit 314b.

The first subunit 314a is provided, on the one hand, with connection means for a bundle 337a connected to the plasma-cutting torch 2, the said bundle 337a grouping together all the means for supplying electricity and gas and for circulating the coolants, which are necessary for proper operation of the said plasma-cutting torch 2 and, on the other hand, means for adjusting the pressures and/or flow rates, safety components to allow effective control of the gas circulation so as to allow the plasma-cutting/plasma-marking installation to operate only if predetermined minimum values of pressure and/or flow rate are reached, as well as components for opening and closing the gas circuits, for example solenoid valves, responding to the sequential instructions from the control manager 310.

Furthermore, the subunit 314a is provided with connection means for the pipes coming from the central gas supply 312, connection means for the coolant supply pipes coming from the cooling unit 313a, connection means for the electrical power cables coming from the generator 311b, making it possible to supply the electrode and the nozzle of the plasma-cutting torch 2, as well as means for connecting the bundles of electrical wires coming from the control manager 310 for centralized management of the functions of monitoring, adjusting and controlling the components in connection with the gases contained in the subunit 314a.

The second subunit 314b is provided, on the one hand, with connection means for a bundle 338a connected to the plasma-marking torch 1, the said bundle 338a grouping together all the means for supplying electricity and gas and for circulating the coolants, which are necessary for proper operation of the said plasma-marking torch 1 and, on the other hand, with the means for adjusting the pressures and/or flow rates, safety components to control the gas circulation so as to allow the plasma-cutting/plasma-marking installation to operate only if predetermined minimum values of pressure and/or flow rate are reached, as well as components for opening and closing the gas circuits, for example solenoid valves, responding to the sequential instructions from the control manager 310.

Furthermore, the subunit 314b comprises connection means for the pipes coming from the central gas supply 312, connection means for the coolant supply pipes coming from the cooling unit 313b, connection means for the electrical power cables coming from the generator 311a, making it possible to supply the electrode and the nozzle of the plasma-marking torch 1, as well as means for connecting the bundles of electrical wires coming from the control manager 310 for centralized management of the functions of monitoring, adjusting and controlling the components in connection with the gases contained in the subunit 314b.

This may be supplemented, in order to ensure correct use and effective control of the installation, not only with a vertical axis or (z-z) axis with an actuator intended to bring the head of the plasma-marking torch to a suitable distance from the sheet metal to be marked and to maintain a substantially constant distance between the said marking-torch head of the said sheet metal to be marked, in particular using a sensing system, but also means for programming the marking paths and positions in conjunction with the trimming programming, so as to optimize manufacturing times.

It is furthermore preferable, especially in the case of manufacturing small articles, to carry out the operation of marking the article first, and only then the cutting operation, so as to avoid any possible displacement of the cut article from the programmed origin because of the release of stresses internal to the article during the thermal cycle to which the trimming process subjects it.

Another possible situation is for the workpieces to be supported insufficiently by the sheet-metal support rig, that is to say the support means for the workpieces, and at the end of trimming, when the workpiece becomes separated from the sheet-metal plate from which it has been cut out, it bends and/or even falls into the bottom container for recovering waste and slag. Therefore, in both cases, any subsequent marking operation would be ineffective.

In other words, the manufacturing programme should be adapted, in particular, according to the size of the workpieces to be marked and the support quality offered by the sheet-metal support rig.

The manufacturing programme may therefore, for example, be designed in two sequential subroutines, the first subroutine being dedicated to marking all the workpieces connected around one another in the format of the sheet metal to be trimmed, and the second being dedicated to cutting out all the workpieces after marking.

Another possible procedure consists in alternate marking/trimming programming piece by piece in order to reduce the tool travel and therefore the overall manufacturing time of the programme for workpieces fitted around one another in the sheet-metal format.

Other intermediate solutions may, of course, also be envisaged.

Furthermore, in order to mark the workpieces by defining alphanumeric characters, a generator of parameterizable characters is advantageously integrated in the installation.

Although the above embodiment uses torches struck by high frequency, torches struck in a different way may equally well be used in the scope of the present invention, in particular torches struck by a short circuit between the electrode and the nozzle, such as a torch similar or identical to the one described in document EP-A-599709, the electrode of which moves relative to the nozzle or, alternatively, a torch whose nozzle moves relative to the electrode, in order to create the short circuit needed for striking.

A combined automatic installation for plasma-jet marking and cutting and/or welding of metal workpieces according to the present invention may advantageously be included in an industrial line or installation for manufacturing, treating or processing metal workpieces, in particular boiler-making workpieces and workpieces for land vehicles or boats.

A combined automatic installation for plasma-jet marking and cutting and/or welding metal workpieces according to the present invention is furthermore of significant economic benefit because the simplification which it provides allows substantial savings in comparison with non-combined conventional installations, since, according to the present invention, it is no longer absolutely necessary to have two complete machines, that is to say one for marking and the other for cutting or welding.

What is claimed is:

1. Combined automatic installation for plasma-jet marking and for cutting and/or welding at least a part of at least one workpiece to be marked and/or cut and/or welded, comprising:

at least one carrying structure carrying at least one plasma-marking torch and at least one cutting and/or welding torch, drive means capable of moving at least the said plasma-marking torch and at least the said cutting and/or welding torch in at least one direction of motion, coolant supply means capable of supplying at least the said plasma-marking torch and at least the said cutting and/or welding torch with at least one coolant, gas supply means capable of supplying at least the said plasma-marking torch and at least the said cutting and/or welding torch with at least one gas, electric-current supply means capable of supplying at least the said plasma-marking torch and at least the said cutting and/or welding torch with electric current, and control means capable of initiating at least one movement of the said plasma-marking torch and of the said cutting and/or welding torch relative to the said at least one workpiece to be marked and cut and/or welded.

2. Installation according to claim 1, characterized in that the control means are capable of controlling the said drive means so as to make it possible to move at least the said plasma-marking torch along at least one path defining at least one part of the mark to be made on the said workpiece and/or at least the said cutting and/or welding torch along at least one cutting path and/or at least one path corresponding to a welding plane of the said at least one workpiece.

3. Installation according to either of claim 1, characterized in that the control means are capable of furthermore initiating at least one start and/or stop of the coolant, electric-current and/or gas supply to at least the said plasma-marking torch, and/or at least one start and/or stop of the coolant, electric-current and/or gas supply to at least the said cutting and/or welding torch.

4. Installation according to claim 1, characterized in that the control means are capable of controlling the said drive means in order to move the said plasma-marking torch and/or the said cutting and/or welding torch in several directions of motion, in particular in translation and/or rotation.

5. Installation according to claim 1, characterized in that the said drive means are motorized, the said drive means preferably comprising at least one electric motor and, optionally, at least one position encoder and/or at least one tacho generator.

6. Installation according to claim 1, characterized in that it furthermore has sensing means capable of allowing at least one determination of at least one parameter representing the distance separating the plasma-marking torch and/or the cutting and/or welding torch from a workpiece to be marked and/or cut and/or welded, and preferably, adjusting the said distance as a function of a parameter representing a desired distance value.

7. Installation according to claim 1, characterized in that it furthermore has workpiece-support means for carrying and/or holding, at least temporarily, at least one workpiece to be marked and/or cut and/or welded.

8. Installation according to claim 1, characterized in that it furthermore has means for delivering at least one workpiece to be marked and/or means for removing at least one marked workpiece.

9. Installation according to claim 1, characterized in that at least one cutting and/or welding torch and at least one plasma-marking torch are carried by the same moving subunit of the said carrying structure.

10. Installation according to claim 8, characterized in that the plasma-marking torch and/or the cutting and/or welding torch are selected from single- or double-flow plasma torches, or in that the cutting and/or welding torch is selected from laser-welding or cutting torches and oxycutting torches.

11. Installation according to claim 1, characterized in that it furthermore has fume-extraction means and/or waste disposal means.

12. Installation according to claim 1, characterized in that the control means comprise numerical-control means.

13. Installation according to claim 1, characterized in that the plasma-marking torch and/or the cutting and/or welding torch are mounted on means with rails for moving the said marking torch and/or cutting and/or welding torch towards and/or away from the upper surface of at least one workpiece to be processed.

14. Combined automatic process for marking and cutting at least one workpiece, in particular at least one metal workpiece, using at least one plasma-marking torch delivering at least one plasma-marking jet and at least one plasma-cutting torch delivering at least one plasma-cutting jet, comprising the following steps:

(a) supplying at least one plasma-marking torch with at least one electric current and with at least one plasma gas, and generating at least one plasma-marking jet having a marking energy greater than or equal to a first energy threshold and less than a second energy threshold, the said first energy threshold corresponding to the minimum energy required to obtain at least one local change in coloration of the workpiece to be marked, and the said second energy threshold corresponding to the energy required to obtain complete melting through the full thickness of the said workpiece to be marked, (b) supplying at least one plasma-cutting torch with at least one electric current and at least one plasma gas, and generating at least one plasma-cutting jet having a cutting energy greater than or equal to the said second energy threshold corresponding to the energy required to obtain complete melting through the full thickness of the said workpiece to be cut, (c) plasma-jet marking the said workpiece to be marked by subjecting at least one part of the said workpiece to at least the said plasma-marking jet having the said marking energy, and (d) plasma-jet cutting the said workpiece to be cut by subjecting at least one part of the said workpiece to at least the said plasma-cutting jet having the said cutting energy.

15. Combined automatic process for marking and welding at least one workpiece, in particular at least one metal workpiece, using at least one plasma-marking torch delivering at least one plasma-marking jet and at least one welding torch delivering at least one welding gas flow, comprising the following steps:

(a) supplying at least one plasma-marking torch with at least one electric current and with at least one plasma gas, and generating at least one plasma-marking jet having a marking energy greater than or equal to a first energy threshold and less than a second energy threshold, the said first energy threshold corresponding to the minimum energy required to obtain at least one change in coloration of the workpiece to be marked, and the said second energy threshold corresponding to the energy required to obtain complete melting through the full thickness of the said workpiece to be marked, (b) supplying at least one welding torch with at least one electric current and at least partially melting through the thickness of the said at least one workpiece to be welded, (c) plasma-jet marking the said workpiece to be marked by subjecting at least one part of the said workpiece to at least the said plasma-marking jet having the said marking energy.

16. Industrial line or installation for manufacturing, treating or processing metal workpieces, including a combined automatic installation for plasma-jet marking and for cutting and/or welding the said workpieces according to claim 1.

* * * * *